J. Q. CLARKE.
ANIMAL TROUGH.
APPLICATION FILED AUG. 12, 1909.
1,066,710.
Patented July 8, 1913.
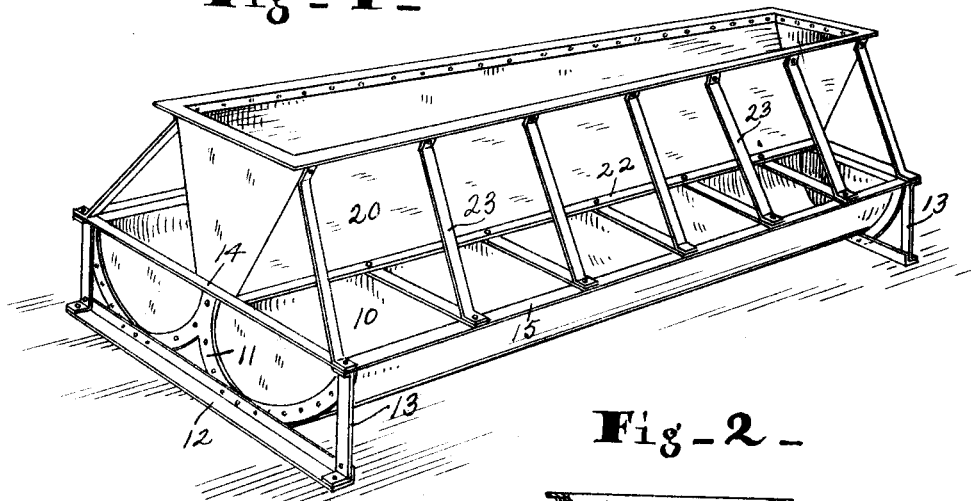
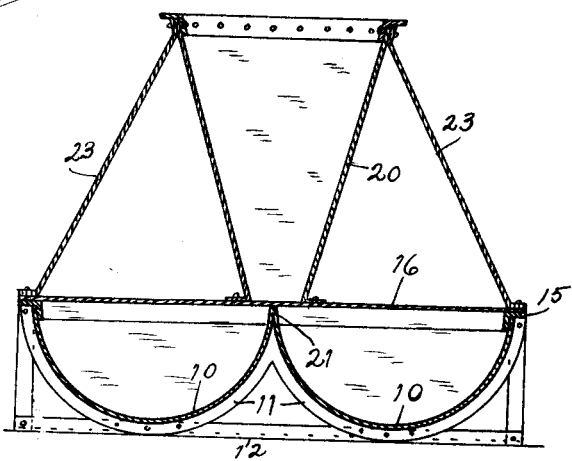
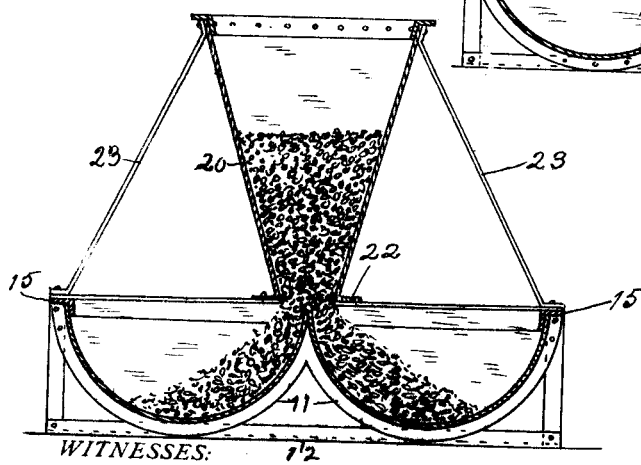
WITNESSES:
O. M. McLaughlin
G. H. Borck
INVENTOR.
John Q. Clarke.
BY
V. H. Lockwood
ATTORNEY.

UNITED STATES PATENT OFFICE.

JOHN Q. CLARKE, OF CRAWFORDSVILLE, INDIANA.

ANIMAL-TROUGH.

1,066,710. Specification of Letters Patent. Patented July 8, 1913.

Application filed August 12, 1909. Serial No. 512,496.

*To all whom it may concern:*

Be it known that I, JOHN Q. CLARKE, of Crawfordsville, county of Montgomery, and State of Indiana, have invented a certain new and useful Animal-Trough; and I do hereby declare that the following is a full, clear, and exact description thereof, reference being had to the accompanying drawings, in which like letters refer to like parts.

The object of this invention is to provide an improved construction of animal trough, especially of the type that has a feed hopper.

One feature of the invention consists in a plurality of troughs side by side and secured together, all preferably being formed of one sheet of metal. The plurality of troughs thus secured together coöperate in maintaining the troughs in an upright position and prevent upsetting, and also, they strengthen each other.

Another feature of the invention consists in providing a trough with separating bars across the same at intervals and with a rear upwardly extending wall along one side with separating braces at intervals for maintaining the rear wall in place. The upwardly extending wall prevents hogs from getting into the trough, and the separating bars and braces prevent them from crowding each other, and it is a very strong construction.

Another feature of the invention consists in providing a feed hopper over the edge of one trough or the edges of adjacent troughs, so that there will be a narrow longitudinal slot at the lower edge of the hopper for permitting a limited quantity of grain to drop by gravity which will collect in the trough below along the side next to the hopper, but will not fill the trough. This tends to prevent the animals from throwing the feed out of the trough, and also limits and graduates the supply of feed thereto.

The nature of the invention will be understood from the accompanying drawings and the following description and claims.

In the drawings Figure 1 is a perspective view of a preferred form of my invention. Fig. 2 is a transverse section thereof through a set of braces and separating bars. Fig. 3 is a section across the same between a pair of braces and separating bars and showing feed therein.

In the construction herein shown two trough chambers are formed side by side out of one piece of sheet metal 10 formed transversely, as shown in Figs. 2 and 3, so that at the middle thereof it is turned back on itself to form an upwardly-extending partition which constitutes the inner edge of the two troughs. At the ends said sheet metal troughs 10 are secured to end pieces 11 made to conform to the ends of the troughs, and which are secured to end frames formed of angle iron, or the like, having a bottom portion 12, end uprights 13 and a cross upper bar 14. The outer upper edges of the two troughs are reinforced by and secured to angle iron horizontal bars 15. This construction of end frames formed by the parts 12, 13 and 14 is important in maintaining the troughs upright and in position, but the plurality of troughs secured together also accomplishes this same result.

There are horizontal cross bars 16 extending from the outer side of one trough to the outer side of the other and secured to the horizontal bars 15. These bars are separating bars to prevent the animals from crowding each other, and also are tie bars adapted to tie the remote edges of two troughs side by side into one entire construction.

The feed hopper 20 is mounted longitudinally and midway between the sides of the two troughs, that is, over the middle partition or edge 21 between the two troughs. Said hopper tapers downwardly and is open at its lower end so as to discharge into both troughs about equally. The opening slot at the bottom of the hopper leading into each trough is preferably about an inch wide in actual construction, but may be varied according to the character of the feed. The hopper is secured in position by outwardly extending flanges 22 along the lower edge thereof, which are secured to the cross bars 16, and the upper portion of the hopper is braced in position by braces 23 on each side that extend down and are secured to the outer edges of the troughs, preferably upon the outer ends of the bars 16, so that the brace bars will be over the separating bars and the brace bars will serve as separating bars. The brace bars 23 also serve to tie the upper portion of the feed hopper 20 to the outer edges of the trough chambers. The outer wall of the hopper being mounted above one side of a trough so as to form an upwardly extending wall to the trough, prevents animals from getting into the trough, as their heads would bump against this wall in attempting to get into the trough and they could not walk in the trough or troughs.

What I claim as my invention and desire to secure by Letters Patent is:

An animal trough the body of which is formed of sheet metal folded longitudinally to provide an upwardly-extending partition at its median line, whereby to divide the trough into two chambers, said partition and the outer edges of said chambers being in substantially the same horizontal plane, a plurality of transversely-extending tie-bars secured upon the outer edges of the trough chambers and resting upon said partition and serving to hold the outer edges of said chambers together and thereby brace the trough body, a hopper arranged above said chambers and seated upon said tie-bars and having its lower end open and disposed over said partition and discharging at both sides of the latter into the trough chambers, and brace-bars connected to the upper portions of the sides of the hopper and also to the ends of said tie-bars and arranged in line with said tie-bars and serving to tie the top of the feed hopper to the outer edges of the trough chambers.

In witness whereof, I have hereunto affixed my signature in the presence of the witnesses herein named.

JOHN Q. CLARKE.

Witnesses:
C. W. KELLISON,
C. O. CARLSON.